June 29, 1965 W. L. MORRISON 3,191,793
INSULATED COLLAPSIBLE SHIPPER CONTAINER
Filed Feb. 28, 1963 3 Sheets-Sheet 1
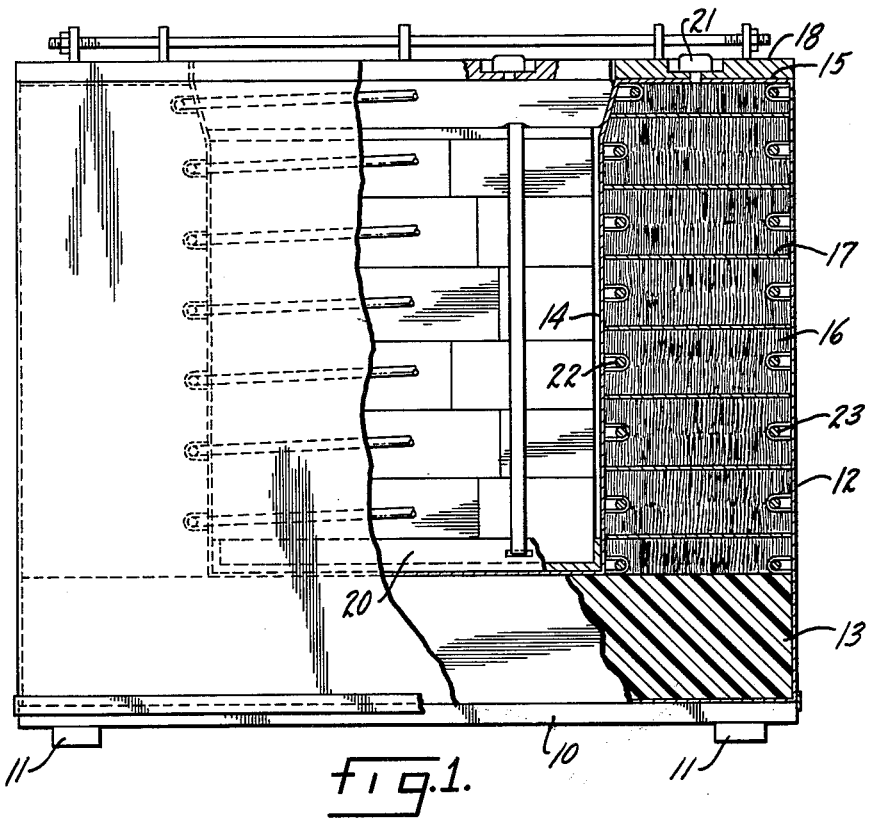
fig.1.
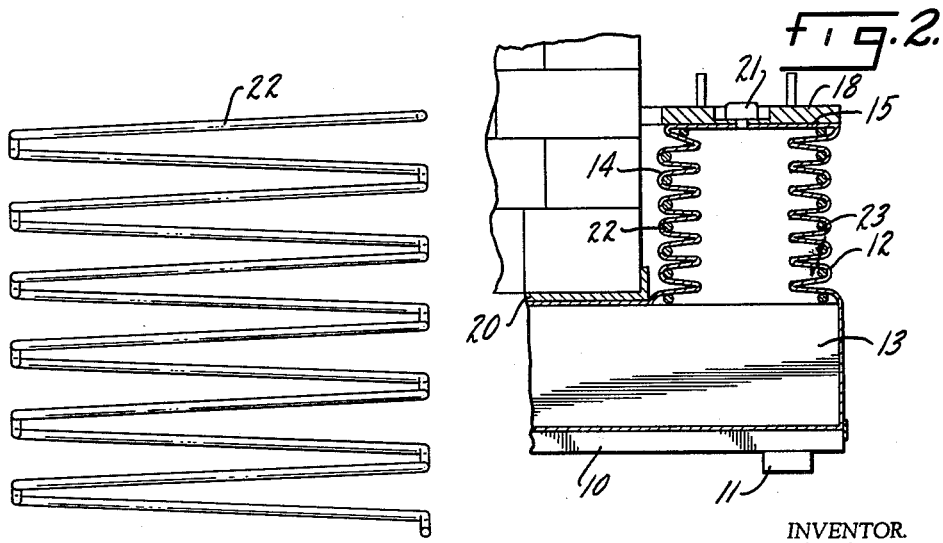
fig.2.
fig.3.
INVENTOR.
Willard L. Morrison,
BY Parker & Carter
Attorneys.

June 29, 1965     W. L. MORRISON     3,191,793
INSULATED COLLAPSIBLE SHIPPER CONTAINER
Filed Feb. 28, 1963     3 Sheets-Sheet 2

INVENTOR.
Willard L. Morrison,
BY Parker & Carter
Attorneys.

June 29, 1965   W. L. MORRISON   3,191,793
INSULATED COLLAPSIBLE SHIPPER CONTAINER
Filed Feb. 28, 1963   3 Sheets-Sheet 3
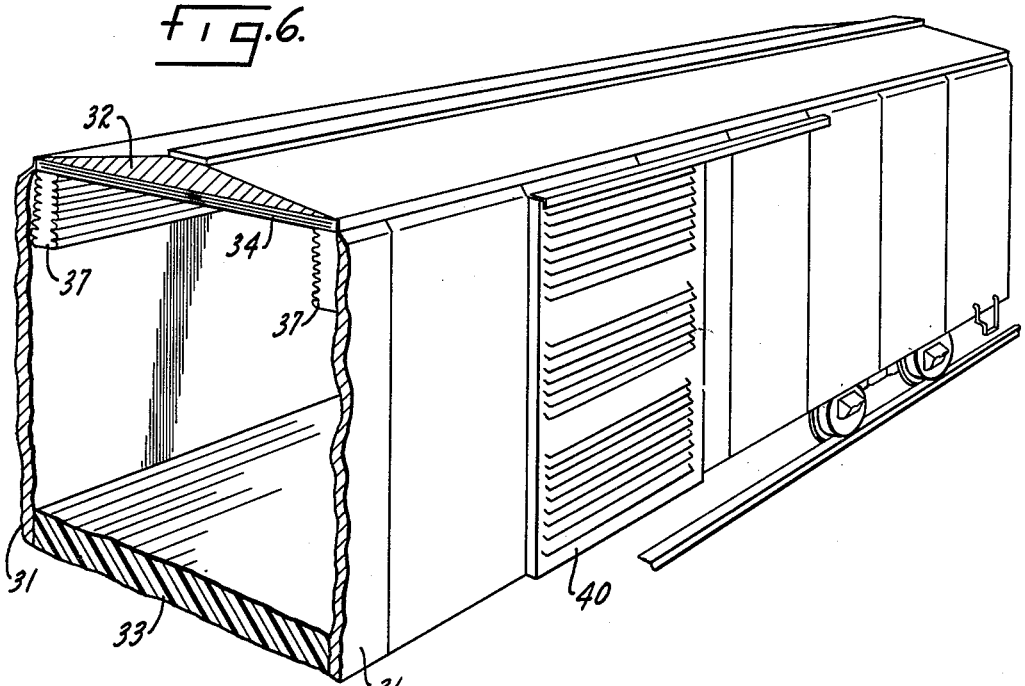
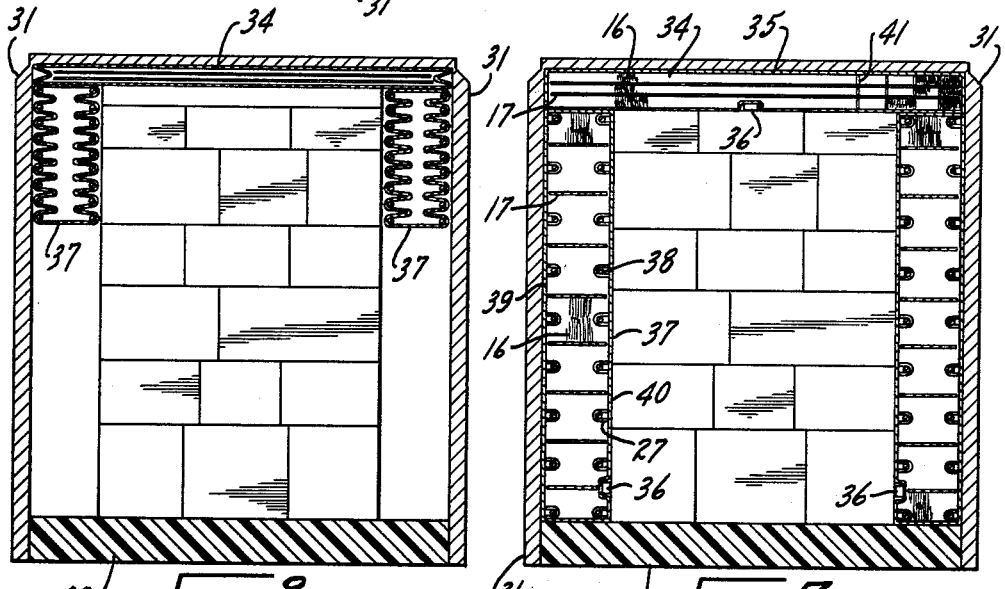
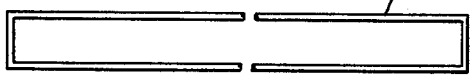
INVENTOR.
Willard L. Morrison,
BY Parker & Carter
Attorneys.

United States Patent Office 3,191,793
Patented June 29, 1965

3,191,793
INSULATED COLLAPSIBLE SHIPPER CONTAINER
Willard L. Morrison, Lake Forest, Ill., assignor to Elmwood Liquid Products, Inc., New York, N.Y., a corporation of New York
Filed Feb. 28, 1963, Ser. No. 261,748
12 Claims. (Cl. 220—9)

This invention relates to improvements in insulated shipper containers and has for one object to provide portable, collapsible shipper container especially adapted for insulated shipment of less than carload lots.

Another object is to provide an insulated shipper container which can be easily loaded and unloaded and which can be collapsed empty for return shipment, thereby greatly reducing the cost of return shipment of the container.

Another object is to provide a flexible, expandable, collapsible insulating container that is light, cushions the contents against excessive shock and is easily assembled and disassembled.

Another object is to provide a shipper container which includes only two main separable parts, the ported container itself and the removable door and attaching means.

Another object of the invention is to provide an insulating shipper container, which includes a base, an expandable, contractable gas tight wall extending upwardly therefrom when expanded to enclose the contents of a cold storage chamber and which when collapsed, exposes such contents for removal.

Another object is to provide such an arrangement where an expandable, contractable wall encompassing a storage chamber may be in contact with the contents of the chamber when expanded but disengage the contents laterally and collapses downwardly when contracted.

Other objects will appear from time to time throughout the specification and claims.

The invention is illustrated diagrammatically in the accompanying drawings, wherein—

FIGURE 1 is a side elevation in part section of a rectangular shipper container in expanded position with door in place and containing material to be insulated;

FIGURE 2 is a detail section of FIGURE 1 showing the container collapsed ready for removal of material ready for return shipment;

FIGURE 3 is a side elevation of one of the supporting springs of FIGURES 1 and 2;

FIGURE 6 is a perspective of a modified form;

FIGURE 7 is a section along the line 7—7 of FIGURE 6 showing the insulating mattress in expanded form;

FIGURE 8 is a section similar to FIGURE 7 showing the mattress collapsed;

FIGURE 9 is a plan view of one of the stop rings shown in FIGURES 7 and 8.

Like parts are indicated by like characters throughout the specification and drawings.

Figure 4:
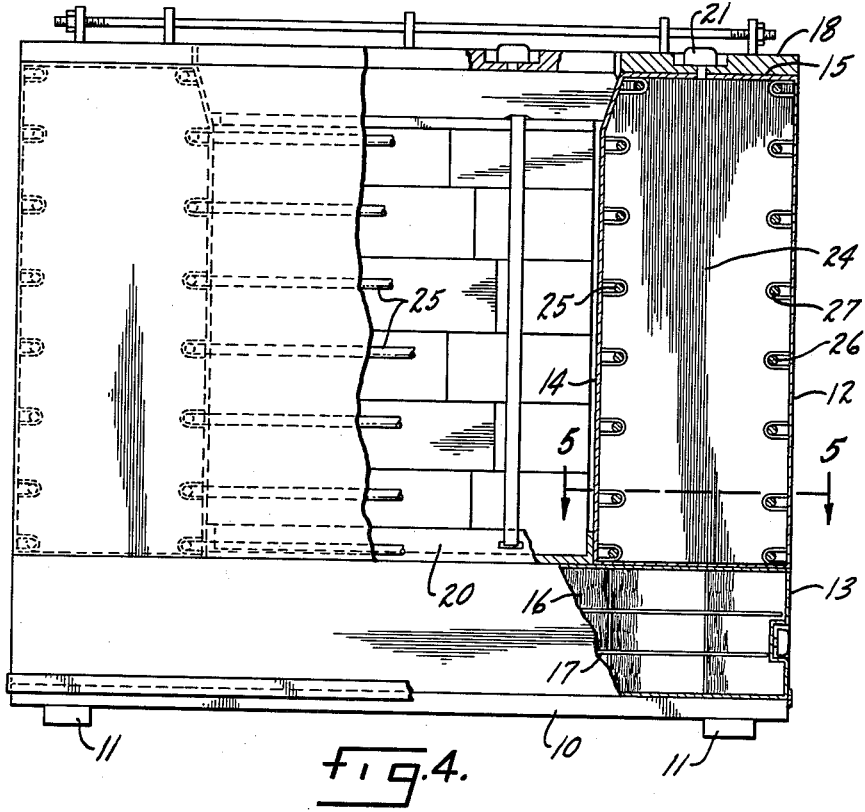
FIGURE 4 is a vertical section similar to FIGURE 1 of a modified form.

A pallet 10 is skidded at 11 for usual manipulation by a fork lift truck. Adhered to the upper surface of the pallet 10 is the bottom of a gas tight bag or outer membrane 12. It may be of fabric or plastic so treated as to be gas and water tight. Contained within the bag 12 and adhering to the bottom thereof is a load supporting panel 13 of insulating material which is co-extensive with the bottom of the bag and the pallet to define a base for an insulating shipper container.

An inner bag or membrane 14 is adhered to the panel 13, extending upwardly therefrom generally parallel with the membrane 12 to define with a diaphragm 15—in gas tight connection as it is with the membranes 12 and 14—an air chamber adapted to contain insulating material.

The insulating material includes closely spaced fibers 16 vertically disposed within the air chamber. These fibers are attached at their ends to a plurality of thin flexible sheets 17 extending generally across the insulating air chamber but not adhered to the membranes 12 and 14. Thus air may pass around these sheets. They might be of air permeable paper or even of fabric. This assembly of sheets and fibers are held in position at top and bottom by adhering to the diaphragm 15 at the top of the panel 13 at bottom. They are so disposed that when the wall is in its maximum upwardly expanded position, the fibers will be straightened out under just sufficient tension to maintain them in generally vertical parallelism with the membranes.

A door frame 18 is adhered to the diaphragm 15 to define a port of access for the insulating container defined by the gas tight expandable, contractable wall which projects upwardly from the base, encloses the insulation in a gas tight insulation chamber and encompasses the cold storage zone bounded at bottom by the panel 13.

An upwardly flanged tray 20 is adhered to the bottom of the bag 14 and is substantially the same cross sectional area as the cold storage chamber defined by the expandable, contractable wall. The door frame 18 is recessed to receive a valved air duct 21 communicating with the interior of the air chamber. Contained within the air chamber are two concentric rectangular coil springs 22 and 23. They rest on the panel 13, extend upwardly to support when expanded by contact with the diaphragm 15, the door frame 18, thus holding the wall in expanded position. The spring 22 is spaced inwardly from the membrane 14. The spring 23 may be spaced from or closer to the diaphragm 15. These springs are attached by a plurality of loops or other attaching means to the membranes, being free to move with them. The spring 22 is spaced inwardly from the membrane so that when the membrane 14 collapses as a result of air being exhausted from the air chamber, the membrane 14 will collapse laterally out of contact with material stored in the cold storage chamber.

When air is withdrawn from the chamber, atmospheric pressure applied to the broadly distended areas of the membranes 12 and 14 will cause the wall to collapse inwardly against the springs but this inward collapse is positively limited by the springs and further atmospheric pressure results in a downward collapse of the entire wall assembly, compressing the springs and the fibrous insulation contained in the air chamber downwardly into the position shown in FIGURE 2. In the interest of clarity, the fibrous insulation is omitted from FIGURE 2 but it will be understood that these fibers spaced closely together as they are, are not so tightly assembled as to prevent collapse and experience has taught that a wall such as this will collapse first laterally and then downwardly to reduce its cross sectional area to much less than thirty percent of its original volume.

When the valved duct 21 is closed after exhausting the air and the container assumes the position of FIGURE 2, material for cold storage can be placed on the tray 20 up to the desired volume of the cold storage chamber because under these circumstances the walls are not merely reduced in height but drawn away from the material socketed in the tray. Then when material is packed, the valve may be opened and air will enter the air chamber as the springs tend to raise the door frame upwardly to expand the wall to the position shown in FIGURE 1. The membranes 12 and 14 being suspended by the spring supported door frame resume their general vertical position out of contact at least with the spring 22.

Figure 5:
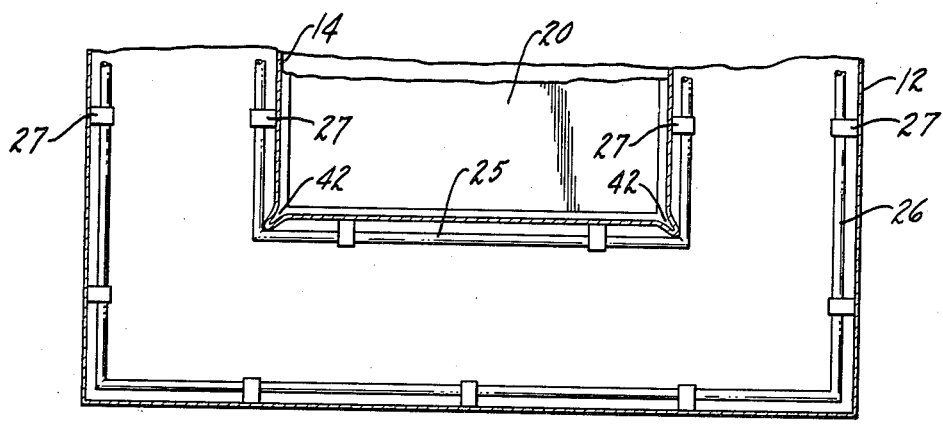
FIGURE 5 is a horizontal section along the line 5—5 of FIGURE 4.

In the modified form of FIGURES 4 and 5, the sheets 17 are omitted. The fibers or threads 24 extend vertically throughout the entire height of the wall, still filling the insulating space with the loosely associated fibers which form the desired insulation.

There is substituted for the springs 22 and 23 a series of concentric spaced rings 25, 26 which encircle the cold storage chamber. The inner rings are spaced inwardly from the membrane 14. The outer rings may be spaced inwardly from or contact the membrane 12. These rings are hung on the membranes 12 and 14 by any suitable means for example, plastic fabric loops 27. With this arrangement and the insulation might be the same as that in FIGURES 1 and 2, the rings limit lateral contraction of the wall but do not operate as do the springs of FIGURES 1 and 2 to maintain it in expanded position. Under these circumstances if air is exhausted through the duct 21, the walls will collapse laterally, will also collapse vertically, being guided generally along lines toward the base by the reationship between the membranes and the rings to assume a position generally similar to FIGURE 2 and the wall under these circumstances will remain in its collapsed position even when the duct 21 is open. Under these circumstances to expand the wall air must be forced into it just as an air mattress has to be pumped up to take its normal position.

The fibers might, if desired, be disposed horizontally, in which case the paper strips adhered to their ends will extend upwardly away from the base. But if that were done, additional means would probably be desirable to prevent lateral separation of the membranes under the atmospheric pressure necessary to expand the wall when the springs were not used. But if the springs were used, such lateral connections between the membranes would not be essential. Such lateral connection might well take the form of the loops 27 joining inner and outer springs or rings to their respective membranes.

In the modified form shown in FIGURES 6, 7, 8 and 9, there is illustrated the same type of insulating mattress as that shown in the preceding figures but the mattress is applied to a freight car or similar portable container. It might equally well be a truck. In this case the container or freight car has the usual rigid structural end and side walls 31, the usual rigid top wall or roof 32 and an insulated floor 33.

One or more mattresses 34 may be attached and mask the roof 32. These mattresses include membraneous walls 35 to define an air chamber which encloses insulating material including the fibers 16 and the flexible sheet 17 just as in the preceding figures. A valved duct 36 similar to the valved duct 21 is associated with the chamber so that air may be extracted from it or allowed to enter it to cause it to expand and contract. FIGURE 8 shows it in contracted non-insulating position and FIGURE 7 shows it in the expanded insulating position.

One or more vertically disposed insulating mattresses 37 extend downwardly from the horizontally disposed roof mattress 34. These mattresses contain the same kind of insulating arrangement as shown in FIGURE 1 with the flexible sheet 17 extending horizontally and the fibers 16 extending vertically.

Contained within each mattress 37 are stop ring members 38. One part of each ring member is connected to the outer membrane 39, the opposite part to the inner membrane 40 by loops 27. These rings are so arranged that when air is withdrawn from the mattress through the valved duct 36, the mattress collapses from the position shown in FIGURE 7 to the position shown in FIGURE 8. It is free to collapse vertically a short distance limited by the rings 38 so as to come out of contact with the car walls 31. Such collapse is immediately followed by the vertical upward collapse toward the roof mattress 34 just as shown in FIGURE 8. The difference here from the device of FIGURES 4 and 5 for example being that the insulating mattress expands upwardly rather than downwardly and is raised toward the roof of the car so as to leave in the car a substantially increased non-insulated space. The further advantage of this arrangement is that as these mattresses and there may be one or more, pull up away from the floor, they do not have to be protected because the uninsulated loading may be placed in the car without danger to the insulation.

There may be one or more mattresses masking or insulating the unapertured wall of the container. If the container is a freight car such as shown in FIGURE 7 with a sliding door 40, there will have to be a separate mattress covering the door. That mattress will have to be equipped just as is the other mattress with a valved duct 36 so that when the sliding door is open the mattress may be collapsed to permit entrance into the car so that after the material requiring insulation has been removed, the other mattresses may also be collapsed to increase the non-insulated shipment space.

The situation is exactly the same if instead of a railroad car with a side door, the insulation were applied to a truck with a rear door.

If desired in order to support the load of the vertical mattresses the horizontal or roof mattress may be equipped with collapsible tension members 41 in the area immediately above the vertical mattresses.

The membranes may be of elastomeric material without reinforcing or may be reinforced with fabric. When the inner membrane 14 collapses away from the contents of the storage zone, the peripheral total length of the four sides of the membrane increases. Unreinforced elastomeric membrane will stretch to make that possible but if the membrane is reinforced it will not stretch. Hence the corners where the inner membrane segments intersect are pleated as at 42 to permit such lengthening of the peripheral sides as is necessary to permit the membrane 14 to clear the contents of the storage zone.

The rings or springs 22, 23 or 25, 26 or 38 furnish a positive stop toward inward movement of the membranes. Experience has taught that, under some circumstances, the positive stop may be omitted. In that case, the paper or fabric sheets 17 interspersed within the insulation and extending horizontally across the wall between the membranes sufficiently limits lateral movement to insure the vertical collapse.

For example, these horizontal spacer members, paper, fabrics or the like not necessarily rigid, act as barriers, perhaps to limit air flow, perhaps to provide local resistance so that the assembly of insulation and these horizontal spacer members causes the limited lateral collapse without interfering with the upward or downward collapse. For instance, in dealing with the device of FIGURE 1, if the springs or rings were omitted, the paper or barrier members interposed between the ends of the fibers being of a different nature limit the collapse in a direction from side to side so as to give time for collapse perpendicular to the layers.

While I have shown a particular type of load supporting insulating base to make it satisfactory for fork lift operation, it will be understood that any suitable base could be provided, even a base similar to the side walls, the essential elements being that the base also must be insulated.

I claim:

1. In an insulated shipper container, a load supporting insulating base, an insulating expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed.

2. In an insulated shipper container, a load supporting insulating base, an insulating expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed.
    stop means limiting the lateral collapse of the wall, the stop means being free to collapse with the wall downwardly toward the base.

3. In an insulated shipper container, a load supporting insulating base, an insulating, expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base when air is withdrawn from the chamber through the valved air duct and to remain collapsed while the duct is closed,
    means within the chamber to cause the wall to expand upwardly when air is admitted to the chamber.

4. In an insulated shipper container, a load supporting insulating base, an insulating, expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed.
    stop means for limiting the lateral collapse of the wall, the stop means being free to collapse with the wall downwardly toward the base,
    said stop means comprising a series of rings encircling the zone, vertically spaced within the chamber, one series adjacent to but spaced from the inner membrane, the other series adjacent to the outer membrane.

5. In an insulated shipper container, a load supporting insulating base, an insulating, expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed.
    stop means for limiting the lateral collapse of the wall, the stop means being free to collapse with the wall downwardly toward the base,
    said stop means comprising a pair of generally spiral springs encircling the zone within the chamber extending from top to bottom thereof, one series being adjacent to but spaced from the inner membrane, the other series adjacent to the outer membrane.

6. In an insulated shipper container, a load supporting insulating base, an insulating expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed,
    the insulating material comprising a multiplicity of fine fibers extending longitudinally within the wall, supporting means extending transversely of the wall to which the opposite ends of the fibers are attached.

7. In an insulated shipper container, a load supporting insulating base, an insulating expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed,
    the insulating material comprising a multiplicity of fine fibers extending longitudinally within the wall, supporting means extending transversely of the wall to which the opposite ends of the fibers are attached,
    said supporting means including vertical sheets extending transversely of the wall.

8. An insulating mattress having generally parallel spaced top bottom, side and end membraneous walls to define a gas tight insulating chamber, expandable, contractable, insulating material filling the chamber, an air duct communicating with the chamber, stop means associated with the side and end walls to limit inward excursion of the walls toward one another when a vacuum is drawn on the chamber, said walls being free after their collapse toward one another has been retarded to collapse with the stop means in a direction parallel to the plane of the walls before collapse of the mattress.

9. In a rigid shipper container having side, top and bottom walls, an insulating mattress depending downwardly adjacent the side wall from the top toward the bottom, the mattress including inner and outer membranes generally parallel with the side wall, defining a gas tight insulating chamber, a valved air duct communicating therewith, expandable, contractable insulating material substantially filling the chamber, the mattress being free to collapse under atmospheric pressure laterally away from the container wall and upwardly toward the roof when the air is withdrawn from the chamber through the valved duct and to remain so collapsed when the duct is closed.

10. In a rigid shipper container having side, top and bottom walls, an insulating mattress depending downwardly adjacent the side wall from the top toward the bottom, the mattress including inner and outer membranes generally parallel with the side wall, defining a gas tight insulating chamber, a valved air duct communicating therewith, expandable, contractable, insulating material substantially filling the chamber, the mattress being free to collapse under atmospheric pressure laterally away from the container wall and upwardly toward the roof when the air is withdrawn from the chamber through the valved duct and to remain so collapsed when the duct is closed, stop means limiting the lateral collapse of the mattress, the stop means being free to move upwardly toward the roof as the mattress collapses in that direction.

11. In an insulated shipper container, a load supporting insulating base, an insulating expandable, contractable wall extending upwardly from the base, encompassing and defining a cold storage zone closed at the bottom by the base, the wall including inner and outer membranes extending upwardly from the base, defining a gas tight insulation chamber, expandable, contractable, insulating material substantially filling the chamber, a valved air duct into the chamber, the wall being free to collapse under atmospheric pressure, laterally away from the contents of the zone and downwardly toward the base, when air is withdrawn from the chamber through the valved air duct and to remain collapsed while the duct is closed, the inner membranes being laterally expandable as the wall collapses laterally away from the contents of the zone.

12. An insulating mattress having spaced, laterally extended, membraneous top and bottom walls, membraneous side and end walls joining them to define a gas tight insulating chamber, the area of the top and bottom walls being much greater than the area of the side and end walls, expandable, contractable, insulating material filling the chamber, an air duct communicating with the chamber, barrier means perpendicular to the top and bottom walls within the chamber to limit inward excursion of the top and bottom walls toward one another when a vacuum is drawn on the chamber, the top and bottom walls and the insulating material being adapted to collapse with the barrier means in a direction perpendicular to the barrier means, the insulatnig means comprising a multiplicity of fine fibers extending parallel to the top and bottom walls, the barrier means comprising thin, flexible sheets perpendicular to the fibers.

References Cited by the Examiner
UNITED STATES PATENTS 2,992,753   7/61   Morrison _____ 220—9

THERON E. CONDON, *Primary Examiner.*